Jan. 12, 1937.                E. B. HUDSON                    2,067,191
                              OIL FILM BEARING
                            Filed Oct. 2, 1934              4 Sheets-Sheet 1

INVENTOR
*Edwin B. Hudson.*
BY
ATTORNEYS.

Jan. 12, 1937. E. B. HUDSON 2,067,191
OIL FILM BEARING
Filed Oct. 2, 1934 4 Sheets-Sheet 2

INVENTOR
EDWIN B. HUDSON.
BY Allen + Allen
ATTORNEYS.

Jan. 12, 1937.  E. B. HUDSON  2,067,191
OIL FILM BEARING
Filed Oct. 2, 1934  4 Sheets-Sheet 3

INVENTOR.
EDWIN B. HUDSON.
BY
ATTORNEYS.

Jan. 12, 1937. E. B. HUDSON 2,067,191
OIL FILM BEARING
Filed Oct. 2, 1934 4 Sheets-Sheet 4

INVENTOR
EDWIN B. HUDSON.
Allen & Allen
ATTORNEYS.

Patented Jan. 12, 1937

2,067,191

UNITED STATES PATENT OFFICE 2,067,191

OIL FILM BEARING

Edwin B. Hudson, Middletown, Ohio, assignor to The American Rolling Mill Company, Middletown, Ohio, a corporation of Ohio Application October 2, 1934, Serial No. 746,539

23 Claims. (Cl. 308—73)

This invention relates in general to a bearing, and more particularly to a bearing of that type depending upon the formation of a plurality of wedge-shaped load sustaining oil films to bear the load.

The accompanying drawings and the following description refer, by way of example, to a bearing installation on rolling mills, and it is for loads of this general type that this invention is primarily intended, although it will be clear that its use is by no means limited to such applications.

Heretofore many types of bearings have been designed and experimented with for use in connection with situations where high radial loads are encountered. It is desirable to use antifriction bearings in most instances where it is possible. However, where the loads are so extremely high and the space allotted for a bearing is limited, as is the case in rolling mill installations, ball and roller bearings have been found not to be successful. The reason for this is that in these bearings, the entire load must be borne in the ball bearing on a plurality of what are actually little more than points, and in the roller bearing on a plurality of what are in substance very narrow lines. Since the area which must bear the load is made up of points or lines in these respective types of bearing, their loads are concentrated at these points or lines and the pressure per unit area is raised to excessive amounts. This makes the life of such a bearing very short and its use highly inefficient and expensive.

Another type of bearing to which attention has been given is that in which a series of rocking segments or blocks are mounted on one of the bearing parts and caused to move over another bearing part in the presence of oil, thus permitting the building up of an oil film between the tiltable block and the second mentioned bearing part. These bearings provide a much larger area of contact between the tiltable blocks and the bearing part where the oil film is formed and thus prevent concentration of stresses there. However, in mounting the blocks on the first mentioned bearing part it has been customary to mount them on pins or relatively sharp fulcrum edges to permit them to tilt freely. Thus in this portion of the bearing only a line contact or other relatively small contact is provided for, and the load is again highly concentrated in spots where the structure is inherently weak. In this type of bearing it is difficult to provide for an adequate supply of oil to provide for the load sustaining oil films and to provide for cooling the oil; the bearings have not been designed so as to be adjustable for clearance and wear; and the designs I have examined make no provision for easy assembly and repair.

It is the principal object of this invention to overcome the difficulties and shortcomings of the prior art set forth and to provide a bearing suitable in every respect for the purpose intended.

It is an object to provide a bearing with a greater load carrying capacity than the same size ball or roller bearing would have.

It is a further object to provide a bearing in which the stresses in the various parts do not exceed the safe working strength of the material.

Another object is to provide a bearing in which line and point contacts for transmission of loads are avoided and high load concentration thus eliminated.

Another object is to provide a bearing in which adjustments may readily be made to regulate running clearances and compensate for wear.

Another object is to provide a bearing of the tiltable segment type in which an ample supply of cool oil is continuously fed into the path of the segments throughout their travel.

Another object is to provide a bearing of the tiltable segment type in which each segment is passed alternately through an unloaded and a loaded area, so as to permit it to build up an oil film during its passage through the unloaded area.

Another object is to provide a bearing which will not wear "out of round".

One other object is to so design and arrange the various parts of the bearing and secure them in position that they may be accurately and positively held in place during operation, yet readily disassembled and assembled for repairs, etc., when occasion may arise.

The various objects and advantages of this invention will become apparent from the following description of an example of the same taken in connection with the accompanying drawings. Reference is made to the claims that follow for expression of the invention inherent in the example described.

Figure 1:
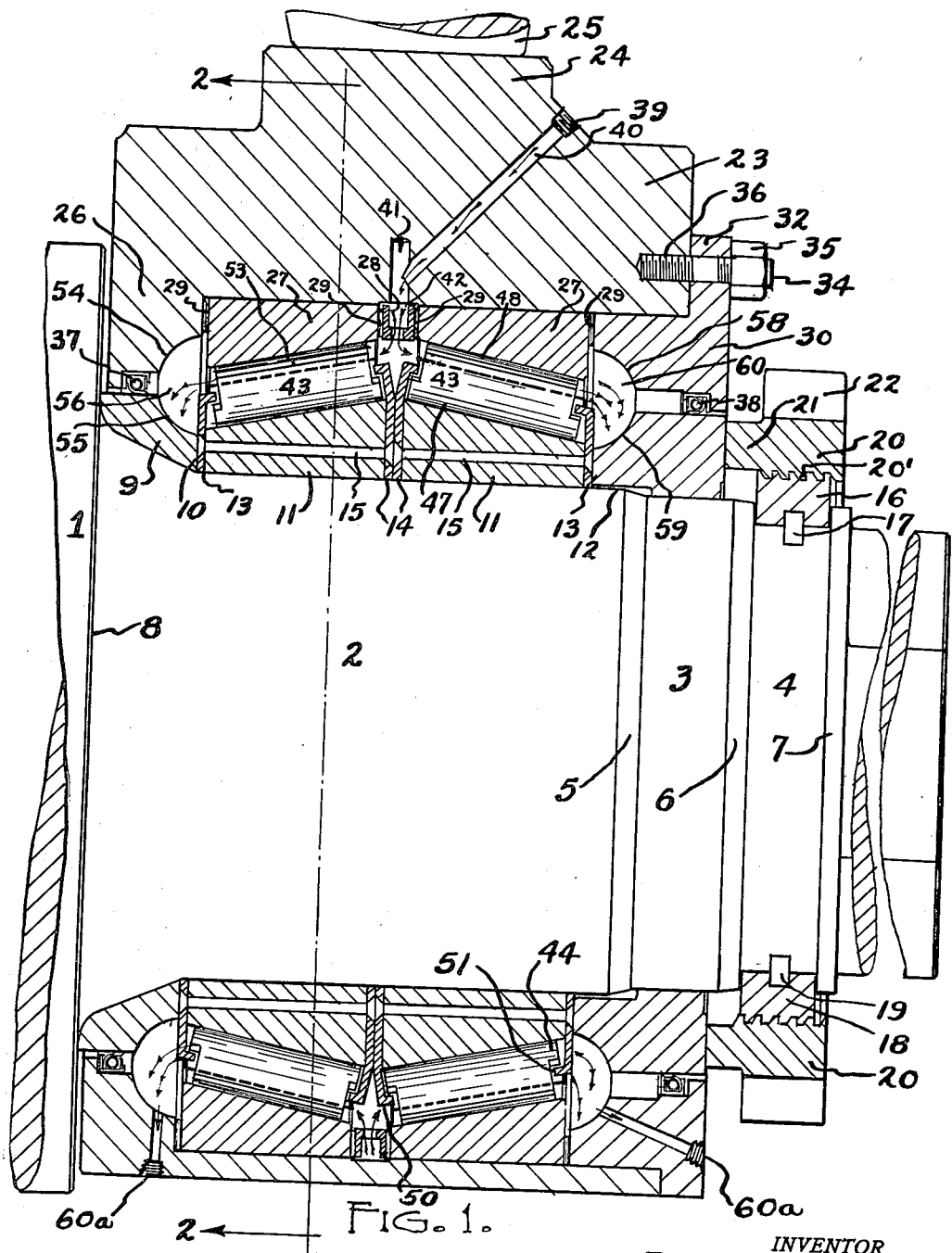
Figure 1 is a vertical sectional view taken along the axis of one embodiment of this invention, illustrated as applied to the backing up roll of a four-high rolling mill.

Referring now more particularly to the drawings, this invention is illustrated in connection with the backing-up roll of a four-high rolling mill, the roll being illustrated at 1 in Figure 1. This roll is provided with a neck designated by the numeral 2 and having a further reduced zone 3 and a peripheral groove 4. The neck 2 and the reduced portion 3 are joined by a short tapered portion 5 and the reduced portion 3 is likewise provided with a similar short tapered zone 6 at its opposite end. The groove 4 is bounded on its side opposite the zone 3 by a radial flange 7. The juncture between the roll 1 and the neck 2 provides a shoulder 8 against which the bearing members which are mounted on the neck 2 are adapted to be held, as will be presently described.

Surrounding the neck 2 and in contact with the shoulder 8 is a spacer ring 9 having a radial face 10 at its extremity opposite the shoulder 8. This face 10 is adapted to hold and locate one of the two inner bearing rings or members 11 which surround the roll neck and rotate with it. The other ring 11 is located and held by means of a filler ring 12. This filler ring 12 has a portion of slightly reduced internal diameter which snugly embraces the reduced zone 3 on the roll neck previously noted which serves to positively position and guide the filler ring. Positioned between the outer ends of the inner bearing members 11 and the spacer ring 9 and filler ring 12, respectively, are a pair of block retainers 13 which constitute the outer retainers. The inner block retainers 14 are positioned between the bearing members 11, the inner and outer retainers for each inner bearing ring being suitably riveted in position to the rings, the structure shown comprising rivets 15 which pass through each pair of retaining rings and the corresponding bearing member.

Within the groove 4 there is a screw ring which is formed in two parts 16 and 18 so that it may be removed from or placed in the groove. These screw ring sections are prevented from rotation within the groove by means of keys 17 and 19 respectively. A locking ring 20 is provided with internal threads 20′ in threaded engagement with the split screw ring just described and is provided with a lateral flange 21 adapted to bear against the filler ring 12 to lock the respective members on to the neck 2 of the roll. This locking ring 20 is also provided with radially extending lugs 22 which enable the ring to be more readily turned upon the inner screw ring to advance it to locking position against the filler ring 12.

The part of the bearing which has been described is designed to rotate with the roll neck or whatever shaft is being supported. The stationary part of the bearing is mounted within a bearing chuck 23 having an enlarged lug 24 on its upper surface for the purpose of receiving a mill screw 25 by which it is adjustably held down to the proper position. This chuck surrounds the inner bearing members 11, and at its end adjacent the shoulder 8 is formed with an inwardly extending radial flange 26, the inner edge of which is disposed in slightly spaced relation with the outer surface of the spacer ring 9. It will be noted as to both the inner and outer bearing rings that they are wedge-shape in cross section. This provides for both thrust and line bearing function in the structure and permits of its adjustment as will be noted.

Mounted within the bearing chuck 23 and in directly opposed relation to the inner bearing members 11 are a pair of outer bearing members 27. Between these members 27 is mounted an oil spacer ring 28 the purpose of which will appear hereinafter. At the opposite ends of each of the outer bearing members and between these bearing members and the spacer or separator ring 28, there are provided a plurality of annular shims 29 which, as will be readily seen, may be removed or amplified. Thus, to bring the rings 27 close to each other and take up any wear in the bearing or readjust the clearance therein, the shims may be shifted from the position on the inner faces of the rings 27 and added to those located at the outer faces of said rings. The parts now described are all held in place within the chuck by means of the flanged ring 30 which is provided with a flange 32 extending radially outwardly and having openings for receiving the studs 34. These studs are provided with nuts 35 in the customary manner and are threaded into the end face of the chuck 23 at 36, as shown, for the purpose of clamping the flange ring 30 in place against the stationary or non-rotatable parts of the bearing.

Between the flange 26 of the chuck and the outer surface of the spacer ring 9 which is opposed thereto, there is provided an oil seal 37 for the purpose of preventing the escape of oil from between these members. A similar oil seal is also provided between the inner surface of the flange ring 30 and the outer surface of the filler ring 12 which is opposed thereto. This oil seal is designated as 38.

The bearing is supplied with oil under pressure through suitable means connected with the threaded opening 39 leading into the duct 40 formed in the chuck 23. This duct 40 empties into the radial opening 41, which in turn communicates with the interior of the annular channel shaped chamber 42 in the separator ring 28.

Between the inner and outer bearing members 11 and 27 there are positioned a series of tiltable bearing blocks 43 which are arranged in two axially off-set rows between the opposed faces of the respective bearing members. Each of these bearing blocks is generally segmental in cross section. Each of the blocks is cut away at its opposite ends to provide lugs 44 by which it is held in position by the retaining rings as will presently appear. The bearing faces of these blocks are beveled at 45 to enable them to ride upon and more readily build up an oil film for sustaining a load. The inner bearing member is provided with a series of grooves 46 in its outer surface, these grooves being of semi-cylindrical cross section and in number corresponding to the number of segmental bearing blocks. Each block is provided with one surface 47 of a cylindrical curvature to fit within a groove 46 and with a bearing surface 48 of substantially the same curvature as the smooth and continuous inner surface 49 of the outer bearing member 27. The grooves or seats for the bearing blocks are at an angle to those in respective inner bearing rings diverging from the central vertical plane of the assembly, so that the bearing blocks will be supported at the same angle as the bearing faces of the outer bearing rings.

Each of the retainer rings 14 is provided with a series of outwardly turned lips 50 and each of the rings 13 with a series of inwardly turned lips 51 which cooperate with each other to loosely engage the lugs 44 on the opposite ends of the respective bearing blocks, whereby these bearing blocks are retained in position both during operation and during the assembling or disassembling of the bearing. This engagement is not such as to inhibit the rocking of the bearing blocks in their seats. It will be appreciated that this arrangement materially facilitates the assembling or disassembling operations as well as insuring the proper position of the blocks at all times.

The separator ring 28 is U-shaped formation with the open face disposed outwardly to provide the annular chamber 42 referred to above. Extending from this chamber into the space between the bearing blocks and communicating therewith at spaced points about the periphery of the bearing are a series of openings 53 through which the oil is forced to the bearing. The inwardly extending flange 26 of the chuck is cut away at 54 and the spacer ring 9 at 55 to provide an oil receiving chamber 56 at one end of the bearing, and the flange ring 30 and filler ring 12 are similarly cut away at 58 and 59 to provide an oil receiving chamber 60 at the other end of the bearing. From these receiving chambers any suitable means may be provided for conducting the oil through ducts 60a to a circulating pump and to a cooling device if necessary, from whence the oil is returned to the duct 40. No pump or heat exchange is illustrated as these may be of any form.

The operation of the bearing structure above described is as follows:

Oil is fed to the bearing under pressure through the duct 40 and the annular chamber 42 and is distributed through the openings 53 to all parts of the bearing between the two rows of bearing blocks. The oil then flows in opposite axial directions between the respective bearing blocks of each row and across the path of movement of these blocks so as to form a continuous supply of oil for the load sustaining oil films. The oil then passes into the oil receiving chambers 56 and 60 at the opposite ends of the bearing from which it goes back to a cooling system and oil circulating pump.

Figure 2:
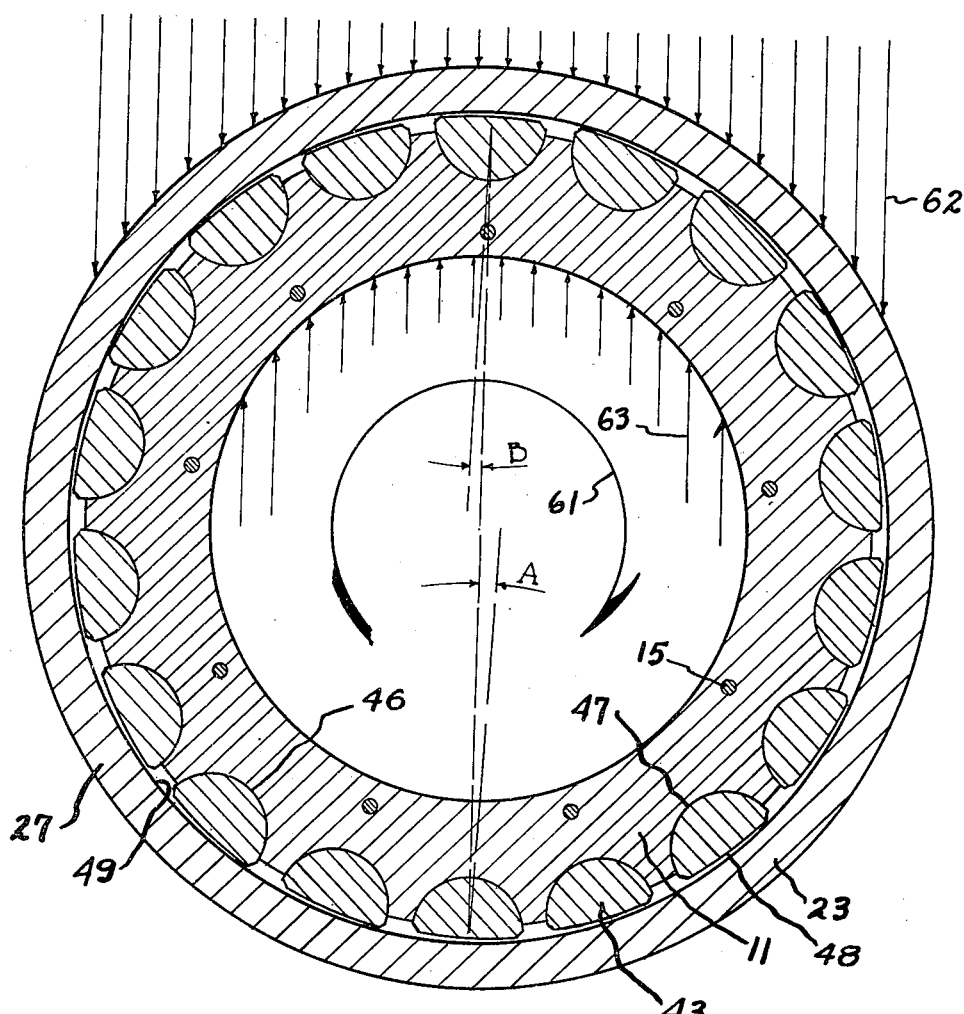
Figure 2 is a vertical transverse sectional view taken along the line 2—2 of Figure 1.
Figure 3:
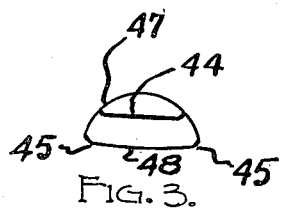
Figure 3 is an end elevation of one of the segments employed in this embodiment of the invention.
Figure 4:
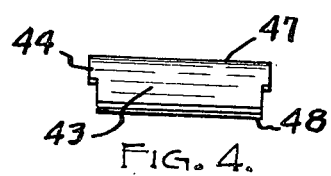
Figure 4 is a side elevation of the segment shown in Figure 3.
Figure 7:
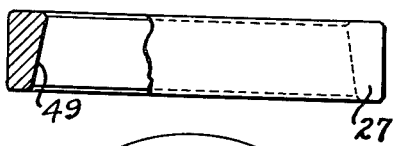
Figure 7 is a view similar to Figure 5 showing one of the outer bearing members.
Figure 8:
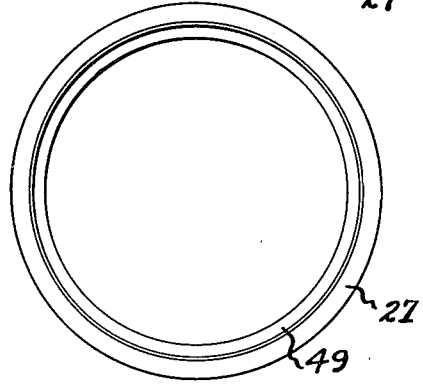
Figure 8 is a view similar to Figure 6 showing the member illustrated in Figure 7.
Figure 5:
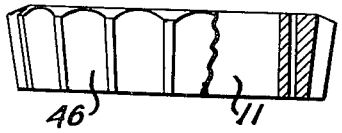
Figure 5 shows a plan view of one of the inner bearing members, parts being broken away and shown in section.
Figure 6:
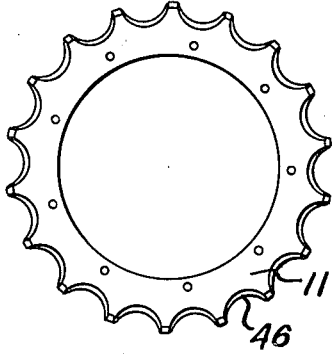
Figure 6 is an end elevation of the member shown in Figure 5.
Figure 9:
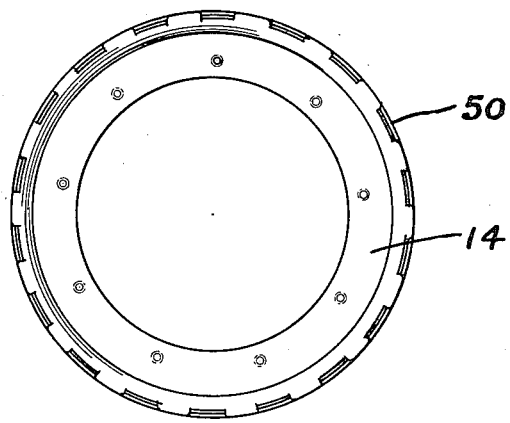
Figure 9 is a face view of one of the segment retaining rings for the central portion of the bearing.
Figure 10:
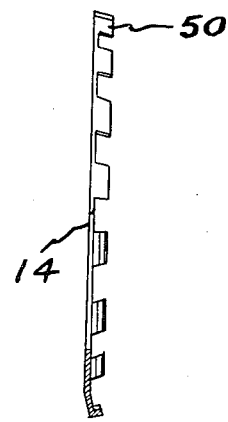
Figure 10 is a side elevation of the ring shown in Figure 9.
Figure 11:
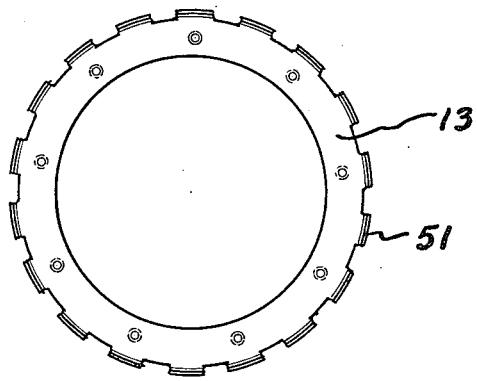
Figure 11 is a view similar to Figure 9 showing one of the segment retaining rings for the ends of the bearing.
Figure 12:
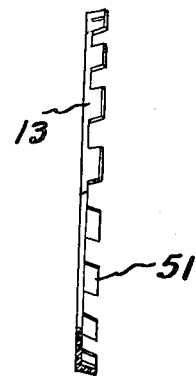
Figure 12 is a side elevation of the ring shown in Figure 11.
Figure 13:
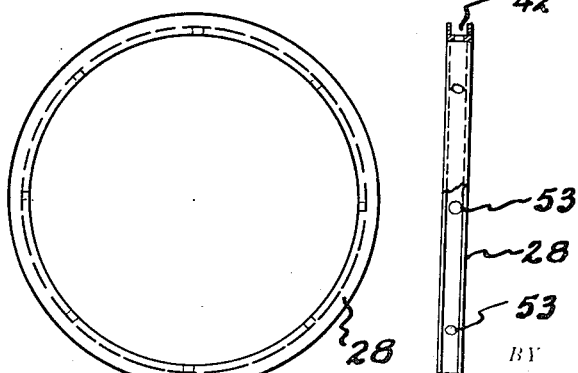
Figure 13 is a view similar to Figure 9 showing the oil separator or spacer ring which fits between the parts of the outer bearing means.
Figure 14:
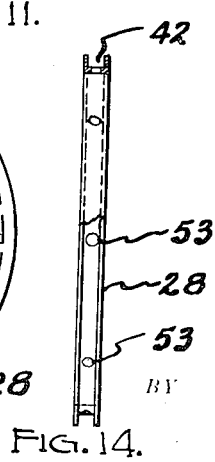
Figure 14 is a side elevation of the ring shown in Figure 13, parts being broken away and shown in section.

The load on the bearing is applied somewhat as illustrated in Figure 2 of the drawings. The arrows 62 illustrate the distribution of force exerted by the mill screw 25 on the chuck and thence on the outer bearing members 27. The arrows 63 illustrate the distribution of upward force exerted by the neck of the roll 1 which, let it be assumed, is rotating in the direction of the arrow 61. It will thus be seen that the load zone takes up approximately 120 degrees along the upper part of the bearing, leaving an unloaded zone of approximately 240 degrees. The bearing rings and blocks are so arranged as to provide a loose fit so that the block bearing faces are somewhat further spaced from the outer bearing ring on that portion opposite to the load. Each of the segmental bearing blocks passes alternately through the unloaded and the loaded zones. As it passes through the unloaded zone, it is permitted to tilt more, as indicated by the angle A in Figure 2 and builds up a relatively heavy oil film of wedge-shape. This oil film decreases somewhat, as indicated by the angle B, when the segment passes into the loaded zone.

From the above it will be appreciated that each segment is given a period of rest which is approximately twice the length of its period of work during each revolution, and that each segment is given the same amount of wear, thus preventing the bearing from wearing "out of round". The continuous presence of a load supporting oil film is assured by virtue of the fact that there is an interval during each revolution in which each segment can build up its oil film unhampered by a load, so as to assure that as each block starts its traverse of the loaded zone, it has between it and the outer bearing member an ample film of oil.

Particular attention is directed to the fact that the projected area of contact between each of the segments 43 and the groove or seat in which it rests in the inner bearing member is substantially the same as the projected area between each segment and the outer bearing member. Thus it will be seen that in this invention the load is transmitted from the inner bearing member to the tiltable segments over a considerable area of contact. The exact relationship between the two areas is not necessary, however, it being only important that the area be substantial. In no place is there a restricted area of contact or any chance of concentration of stress, such as occurs in ball and roller bearings and in previous tiltable segment bearings. It therefore becomes possible to design a bearing in accordance with this invention for the purpose of carrying a given load, which bearing may be very small by comparison with a ball or roller bearing to stand the same load. In addition, the bearing of this invention will be found to be sturdier, better lubricated and cooled, easily adjusted, and easily assembled and disassembled upon occasion. The wear is distributed over a large area and is easily compensated for by adjustment if it becomes too great.

It will thus be apparent that there has been disclosed a device capable of accomplishing all of the objects set forth for this invention. Various changes and modifications may, of course, be made without departing from the spirit or scope of this invention as defined in the appended claims. It is to be understood therefore that the present disclosure is by way of illustration and example only and not by way of limitation.

The illustrated bearing takes up both radial and axial strains, functioning as a thrust and a line bearing. However, the invention may be applied as a line bearing only, by using a single inner bearing ring and outer bearing ring and making the bearing block seats so that they are parallel to the axis of the supported shaft; and the inner circumference of the outer ring is purely cylindrical. The oil distribution would then naturally be from one end of the bearing toward the other rather than in the central vertical plane of the bearing as illustrated.

Having thus described my invention, what I claim as new and desire to secure by Letters Patent, is:—

1. A bearing comprising a fixed outer annular bearing member, a rotary inner bearing member, having a series of curved walled grooves therein, closely spaced bearing blocks having portions to fit said grooves closely, and bearing face portions beveled at their advancing ends in the direction of rotation of the inner member, said bearing face portions corresponding to the inner surface of the fixed outer member but of a total circumference less than said surface, and means for circulating oil to said bearing face portions whereby the blocks are rotated in the grooves and an oil wedge is formed between said bearing face portions and said outer bearing member.

2. A bearing comprising a fixed outer annular bearing member, a rotary inner bearing member, having a series of curved walled grooves therein, closely spaced bearing blocks having portions to fit said grooves closely, and bearing face portions beveled at their advancing ends in the direction of rotation of the inner member, said bearing face portions corresponding to the inner surface of the fixed outer member but of a total circumference less than said surface, and means for circulating oil to said bearing face portions whereby the blocks are rotated in the grooves and an oil wedge is formed between said bearing face portions and said outer bearing member, the portions of the blocks engaged in said grooves when projected being of substantially the same area as the bearing faces of said blocks.

3. A bearing comprising a fixed outer annular bearing member, a rotary inner bearing member, having a series of curved walled grooves therein, closely spaced bearing blocks having portions to fit said grooves closely, and bearing face portions beveled at their advancing ends in the direction of rotation of the inner member, said bearing face portions corresponding to the inner surface of the fixed outer member but of a total circumference less than said surface, and means for circulating oil to said bearing face portions whereby the blocks are rotated in the grooves and an oil wedge is formed between said bearing face portions and said outer bearing member, said oil circulating means including means for supplying oil under pressure at one end of said assembly of blocks and discharging it at the other.

4. A bearing comprising a fixed outer annular bearing member, a rotary inner bearing member, having a series of curved walled grooves therein, closely spaced bearing blocks having portions to fit said grooves closely, and bearing face portions beveled at their advancing ends in the direction of rotation of the inner member, said bearing face portions corresponding to the inner surface of the fixed outer member but of a total circumference less than said surface, and means for circulating oil to said bearing face portions whereby the blocks are rotated in the grooves and an oil wedge is formed between said bearing face portions and said outer bearing member, and means for retaining said blocks in said grooves comprising members secured to the inner bearing member and having lips loosely engaging end portions on the blocks.

5. A bearing comprising radially spaced inner and outer bearing means and two axially off-set rows of bearing blocks formed with seating surfaces having a radius of curvature, and grooves for conforming to said surfaces formed in the inner bearing means circumferentially thereof whereby to present two rings of tiltable bearing blocks, said outer bearing means and said blocks having bearing surfaces spaced and cooperating on rotation to form therebetween wedge shaped spaces for load sustaining oil films, the bearing surfaces on the blocks in one of said rows sloping in one direction axially of the bearing, and the bearing surfaces on the blocks in the other of said rows sloping in the opposite direction axially of the bearing, said outer bearing means being the fixed element of the bearing and formed in two parts each providing the surface for cooperating with one of said rings of bearing blocks.

6. A bearing comprising radially spaced inner and outer bearing means and two axially off-set rows of bearing blocks formed with seating surfaces having a radius of curvature, and grooves for conforming to said surfaces formed in the inner bearing means circumferentially thereof whereby to present two rings of tiltable bearing blocks, said outer bearing means and said blocks having bearing surfaces spaced and cooperating on rotation to form therebetween wedge shaped spaces for load sustaining oil films, the bearing surfaces on the blocks in one of said rows sloping in one direction axially of the bearing, and the bearing surfaces on the blocks in the other of said rows sloping in the opposite direction axially of the bearing, said outer bearing means being the fixed element of the bearing and formed in two parts each providing the surface for cooperating with one of said rings of bearing blocks, and means for adjusting the position of said two parts axially with respect to each other to provide for wear take up and maintenance of proper clearance between said outer bearing means and said blocks.

7. A bearing comprising radially spaced inner and outer bearing means and two axially off-set rows of bearing blocks formed with seating surfaces having a radius of curvature, and grooves for conforming to said surfaces formed in the inner bearing means circumferentially thereof whereby to present two rings of tiltable bearing blocks, said outer bearing means and said blocks having bearing surfaces spaced and cooperating on rotation to form therebetween wedge shaped spaces for load sustaining oil films, the bearing surfaces on the blocks in one of said rows sloping in one direction axially of the bearing, and the bearing surfaces on the blocks in the other of said rows sloping in the opposite direction axially of the bearing, said outer bearing means being the fixed element of the bearing and formed in two parts each providing the surface for cooperating with one of said rings of bearing blocks, and means for introducing oil between said rings of blocks and withdrawing it continuously from the outer ends of said rings of blocks.

8. A bearing comprising radially spaced inner and outer bearing means and two axially off-set rows of bearing blocks tiltably mounted on the inner bearing means and having operative positions radially between said means, said outer bearing means and said blocks having bearing surfaces cooperating on rotation to form therebetween wedge shaped spaces for load sustaining oil films, the bearing surfaces on the blocks in one of said rows sloping in one direction axially of the bearing, and the bearing surfaces on the blocks in the other of said rows sloping in the opposite direction axially of the bearing, said outer bearing means being in two parts each providing the surface for cooperating with one of said rows of bearing blocks, and means for adjusting the position of said two parts axially with respect to each other to provide for wear take up and maintenance of proper clearance between said outer bearing means and said blocks.

9. A bearing comprising radially spaced inner and outer bearing means and two axially off-set rows of bearing blocks tiltably mounted on the inner bearing means and having operative positions radially between said means, said outer bearing means and said blocks having bearing surfaces cooperating on rotation to form therebetween wedge shaped spaces for load sustaining oil films, the bearing surfaces on the blocks in one of said rows sloping in one direction axially of the bearing, and the bearing surfaces on the blocks in the other of said rows sloping in the opposite direction axially of the bearing, said outer bearing means being in two parts, each providing the surface for cooperating with one of said rows of bearing blocks, and means for adjusting the position of said parts axially with respect to each other to provide for wear take up and maintenance of proper clearance between said outer bearing means and said blocks, and means for continuously introducing oil between said rows of blocks and forcing it in opposite directions between the blocks of the respective rows to furnish a continuous oil supply for said wedge shaped load sustaining oil films and to cool the bearing.

10. A bearing comprising radially spaced inner and outer bearing means and two axially off-set rows of bearing blocks formed with seating surfaces having a radius of curvature, and grooves for conforming to said surfaces formed in the inner bearing means circumferentially thereof whereby to present two rings of tiltable bearing blocks, said outer bearing means and said blocks having bearing surfaces spaced and cooperating on rotation to form therebetween wedge shaped spaces for load sustaining oil films, the bearing surfaces on the blocks in one of said rows sloping in one direction axially of the bearing, and the bearing surfaces on the blocks in the other of said rows sloping in the opposite direction axially of the bearing, said outer bearing means being the fixed element of the bearing and formed in two parts each providing the surface for cooperating with one of said rings of bearing blocks, the seating surfaces of the bearing blocks when projected substantially subtending the area of the bearing surfaces of the blocks.

11. A bearing comprising radially spaced inner and outer bearing means and two axially off-set rows of bearing blocks formed with seating surfaces having a radius of curvature, and grooves for conforming to said surfaces formed in the inner bearing means circumferentially thereof whereby to present two rings of tiltable bearing blocks, said outer bearing means and said blocks having bearing surfaces spaced and cooperating on rotation to form therebetween wedge shaped spaces for load sustaining oil films, the bearing surfaces on the blocks in one of said rows sloping in one direction axially of the bearing, and the bearing surfaces on the blocks in the other of said rows sloping in the opposite direction axially of the bearing, said outer bearing means being the fixed element of the bearing and formed in two parts each providing the surface for cooperating with one of said rings of bearing blocks, and means for loosely retaining the bearing blocks in the grooves of the inner member comprising elements having lips loosely engaging the ends of the bearing blocks.

12. A bearing comprising radially spaced inner and outer bearing means and two axially off-set rows of bearing blocks formed with seating surfaces having a radius of curvature, and grooves for engaging said surfaces formed in the inner bearing means circumferentially thereof whereby to present two rings of tiltable bearing blocks, said outer bearing means and said blocks having bearing surfaces spaced and cooperating on rotation to form therebetween wedge shaped spaces for load sustaining oil films, the bearing surfaces on the blocks in one of said rows sloping in one direction axially of the bearing, and the bearing surfaces on the blocks in the other of said rows sloping in the opposite direction axially of the bearing, said outer bearing means being the fixed element of the bearing and formed in two parts each providing the surface for cooperating with one of said rings of bearing blocks, and means for supplying oil to said bearing comprising a conduit extending to the space between the parts of the outer bearing member, and a channel forming element located between said parts and extending circumferentially thereof, said channel formed with ports therein, and collecting chambers for the oil located at the outer edges of said parts from which the oil is to be withdrawn.

13. In a bearing, a bearing chuck having an inwardly extending flange at one end, a pair of outer complementarily wedge shaped bearing rings mounted in said chuck, and means for adjusting said rings relative to each other to regulate the bearing clearance comprising removable shims, and a flanged ring removably secured to the opposite end of said chuck and bearing against said outer bearing means to hold it firmly in place, said rings having located between them an oil channel forming element extending circumferentially, and conduit means through the chuck to said channel forming means.

14. In a bearing, a bearing chuck having an inwardly extending flange at one end, a pair of outer complementarily wedge shaped bearing rings mounted in said chuck, and means for adjusting said rings relative to each other to regulate the bearing clearance comprising removable shims, and a flanged ring removably secured to the opposite end of said chuck and bearing against said outer bearing means to hold it firmly in place, said rings having located between them an oil channel forming element extending circumferentially, conduit means through the chuck to said channel forming means, and chambers formed in the flange and in the flanged ring for collecting said oil for recirculation.

15. A thrust and line bearing for rolling mill necks comprising a chuck, a pair of fixed outer bearing rings engaging the cylindrical interior of said chuck and of complementary wedge shape in cross section so as to present divergent angled bearing surfaces, a pair of inner bearing rings tapered in cross section to parallel the outer rings and having semi-cylindrical grooves therein, bearing blocks having bearing surfaces complementary to the outer bearing rings, and otherwise semi-cylindrical to seat in said grooves, means for forming an oil channel between the outer rings and circumferentially thereof with ports therein toward the inner rings, and means for forming oil collection chambers annularly of the chuck outside of the bearing rings, and means for adjusting the axial positions of the outer bearing rings.

16. A bearing comprising inner and outer concentric, relatively movable members, one of said members being fixed, and the other of said members rotating with respect thereto, one of said members having a series of closely spaced curved-walled grooves therein of semi-cylindrical cross section, closely spaced bearing blocks having portions to fit said grooves, closely and bearing-face portions corresponding to the surface of the other one of said relatively movable members, said bearing blocks and grooves located in that one of said relatively movable members which rotates.

17. A bearing comprising inner and outer concentric, relatively movable members, one of said members being fixed, and the other of said members rotating with respect thereto, one of said members having a series of closely spaced curved-walled grooves therein of semi-cylindrical cross section, closely spaced bearing blocks having portions to fit said grooves, closely and bearing-face portions corresponding to the surface of the other one of said relatively movable members, said bearing blocks and grooves located in that one of said relatively movable members which rotates, the edges of said bearing blocks being beveled.

18. A bearing comprising inner and outer concentric, relatively movable members, one of said members being fixed, and the other of said members rotating with respect thereto, one of said members having a series of curved-walled grooves therein of semi-cylindrical cross section, closely spaced bearing blocks having portions to fit said grooves, closely and bearing-face portions corresponding to the surface of the other one of said relatively movable members, said bearing blocks and grooves located in that one of said relatively movable members which rotates, and means for circulating oil to said bearing-face portions whereby the blocks are rotated in said grooves and an oil wedge is formed between said bearing-face portions and the surface of said other one of said relatively movable members.

19. A bearing comprising inner and outer concentric, relatively rotatable members, closely spaced bearing blocks located between said members, said bearing blocks having bearing-face portions corresponding to a face of one of said members upon one side, and upon the other side strain-bearing faces of arcuate shape, arcuate shaped grooves in the other of said relatively rotatable members to accept said strain-bearing portions and conforming thereto, said bearing blocks being rockable with respect to both of said relatively rotatable members and having an area of strain-bearing contact with said second one of said relatively rotatable members, which area of contact is not substantially less than the area of contact of said bearing-face portions with said first one of said relatively rotatable members.

20. A bearing comprising inner and outer concentric, relatively rotatable members, closely spaced bearing blocks located between said members, said bearing blocks having bearing-face portions corresponding to a face of one of said members upon one side, and upon the other side strain-bearing faces of arcuate shape, arcuate shaped grooves in the other of said relatively rotatable members to accept said strain-bearing portions and conforming thereto, said bearing blocks being rockable with respect to both of said relatively rotatable members and having an area of strain-bearing contact with said second one of said relatively rotatable members, which area of contact is not substantially less than the area of contact of said bearing-face portions with said first one of said relatively rotatable members, said grooves being located in that one of said relatively rotatable members which moves further during the operation of said bearing with relation to a fixed external point.

21. A bearing comprising inner and outer concentric, relatively rotatable members, closely spaced bearing blocks located between said members, said bearing blocks having bearing-face portions corresponding to a face of one of said members upon one side, and upon the other side strain-bearing faces of arcuate shape, arcuate shaped grooves in the other of said relatively rotatable members to accept said strain-bearing portions and conforming thereto, said bearing blocks being rockable with respect to both of said relatively rotatable members and having an area of strain-bearing contact with said second one of said relatively rotatable members, which area of contact is not substantially less than the area of contact of said bearing-face portions with said first one of said relatively rotatable members, said grooves being located in that one of said relatively rotatable members which moves further during the operation of said bearing with relation to a fixed external point, and means for circulating oil to said bearing-face portions, said means comprising a port in the one of said relatively rotatable members which moves least with reference to a fixed external point, and a port located to the side of the other of said members.

22. A bearing comprising inner and outer concentric, relatively rotatable members, one of said members being fixed and the other of said members rotating with respect thereto, each of said members being divided into a plurality of conical-face portions of opposite inclination to the axis of said bearing, closely spaced bearing blocks circumferentially arranged between said members, there being a set of said bearing blocks for each of said conical portions, said bearing blocks having bearing-face portions upon one side corresponding to the surfaces of one of said relatively movable members and having strain-bearing portions of arcuate shape on the opposite side, arcuate shaped grooves conforming thereto in the other of said relatively rotatable members, and means for supplying oil to said bearing, said means comprising a passageway through said fixed member and communicating with the interior thereof at a point approximately at the juncture of said conical portions.

23. A bearing comprising inner and outer concentric, relatively rotatable members, one of said members being fixed and the other of said members rotating with respect thereto, each of said members being divided into a plurality of conical-face portions of opposite inclination to the axis of said bearing, closely spaced bearing blocks circumferentially arranged between said members, there being a set of said bearing blocks for each of said conical portions, said bearing blocks having bearing-face portions upon one side corresponding to the surfaces of one of said relatively movable members and having strain-bearing portions of arcuate shape on the opposite side, arcuate shaped grooves conforming thereto in the other of said relatively rotatable members, and means for supplying oil to said bearing, said means comprising a passageway through said fixed member and communicating with the interior thereof at a point approximately at the juncture of said conical portions, the area of continuous contact of said strain-bearing portions of said bearing blocks with one of said relatively movable members being not substantially less than the area of contact of said bearing-face portions of said bearing blocks with the other of said relatively rotatable members.

EDWIN B. HUDSON.